United States Patent Office 3,743,656
Patented July 3, 1973

3,743,656
THIOPHENE AND FURAN LOWER ALKANOIC ACIDS AND DERIVATIVES
Kevan Brown, Reading, and John Frederick Càvalla, Isleworth, England, assignors to John Wyeth & Brother Limited, Maidenhead, England
No Drawing. Continuation-in-part of application Ser. No. 821,075, May 1, 1969, now Patent No. 3,644,399. This application Sept. 15, 1971, Ser. No. 180,840
Int. Cl. C07d *63/12*
U.S. Cl. 260—332.2 A     16 Claims

ABSTRACT OF THE DISCLOSURE

The invention concerns diaryl furan and thiophene lower alkanoic acids and derivatives which are pharmacologically efficacious as anti-inflammatory agents.

---

This application is a continuation-in-part of parent application Ser. No. 821,075, filed May 1, 1969, now U.S. Pat. No. 3,644,399, patented Feb. 22, 1972.

This invention relates to novel heterocyclic aromatic compounds, to processes for the preparation thereof and to pharmaceutical compositions containing such compounds. The heterocyclic aromatic compounds concerned in this invention are furans, thiophenes and pyrroles substituted by two aryl groups and an aliphatic acid group containing from two to six carbon atoms or a derivative thereof.

The present invention provides compounds of the general formula

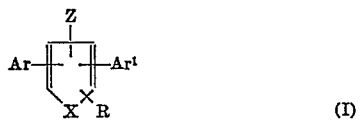

(I)

in which X is oxygen, sulphur or —NY—, Ar and $Ar^1$ are aryl radicals (which includes in the description below heteroaryl radicals) and which may be the same or different; R is an aliphatic acid radical containing from two to six carbon atoms or a derivative thereof, Y is a hydrogen atom or an alkyl, cycloalkyl, aralkyl, aryl or heteroaryl radical which may for example be substituted particularly by halogen, nitro, trifluoromethyl or alkoxy groups or an acyl radical, and Z is a hydrogen atom or an alkyl radical. It is to be understood that one of the radicals Ar, $Ar^1$ and R is in the 2-position and the remaining two of these three radicals are in other positions round the ring excluding the 1-position (i.e. excluding the hetero atom position). Thus, the aryl groups can be in the 2- and 4- positions, the 2- and 3- positions, the 3- and 4- positions, and 3- and 5- positions or the 2- and 5-positions, the radical R being substituted on one of the remaining carbon atoms, and Z being substituted on the last remaining carbon atom.

The compounds of the above general formula exhibit pharmacological activity for example anti-inflammatory activity as shown by tests on warm-blooded animals and/or are intermediates in the preparation of other substituted furans, thiophenes and pyrroles.

Examples of radicals Ar and $Ar^1$ are unsubstituted phenyl, or phenyl substituted by halogen (for example by fluorine, chlorine or bromine, by lower alkyl (e.g. methyl, ethyl, propyl or butyl), by lower alkoxy (e.g. by methoxy, ethoxy, propoxy or butoxy), by nitro, by amino (including alkyl substituted amino groups) in particular by dialkylamino (e.g. dimethylamino), by trifluoromethyl, by mercapto, by methylthio or by methylsulphonyl, as well as 1- and 2-naphthyl, 2- and 3-furyl, 2- and 3-thienyl and 2-, 3- and 4-pyridyl. The radical R preferably is an aliphatic acid radical containing from two to six carbon atoms more preferably from 2 to 4 carbon atoms, or is a suitable derivative thereof e.g. an ester, amide, salt or hydroxamic acid derivative thereof. Preferred examples of radicals R are acetic, n-propionic, iso-propionic, and butyric acid radicals as well as unsaturated acid radicls, such as acrylic acid. If the acid is in the form of an ester it is preferably the alkyl ester such as ethyl ester. The alkyl or alkoxy groups preferably contain 1 to 4 carbon atoms.

Examples of Z are a hydrogen atom, lower alkyl radicals having up to six carbon atoms, partcicularly, methyl, ethyl, propyl or butyl. Examples of Y are lower alkyl radicals as just mentioned and cycloalkyl radicals such as cyclopentyl and cyclohexyl, aralkyl radicals such as benzyl, phenethyl and 1- or 2-phenyl propyl, aryl radicals such as phenyl or 1- or 2-naphthyl and heteroaryl radicals such as 1- or 2-thienyl or furyl, 2- 3- or 4-pyridyl, 2- or 3-indolyl and 2- or 3-pyrrolyl which may be substituted by any of the substituents mentioned above for Ar and $Ar^1$, or Y can be the acyl residue of an inorganic oxy-acid such as an aryl sulphonic acid or alkyl sulphonic acid or of an organic carboxylic acid, particularly Y can be an alkanoyl, cycloalkanoyl, aralkanoyl, aroyl or heteroaroyl residue which can be substituted in the last three cases as aforesaid for Ar and $Ar^1$.

These compounds of general Formula I may be prepared by cyclising a precursor of the furan, thiophene or pyrrole with the simultaneous introduction of the heteroatom. That is to say, the precursor generally is a 1,4-dioxobutane appropriately substituted by the radicals Ar, $Ar^1$, Z and $R^1$ where $R^1$ is the same as R or is a radical convertible thereto. Such a precursor is a compound having the structure.

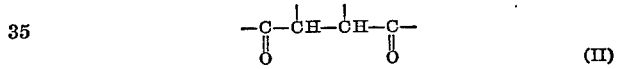

(II)

in which the radical Ar is a substituent on one of the carbon atoms, radical $Ar^1$ on another carbon atom, radical $R^1$ on a third carbon atom, and a hydrogen atom or alkyl radical on the fourth carbon atom. The compounds of general Formula II can be prepared by reacting an enamine with a 1-halo-2-ketoethane, as is described below for the individual special isomers. $R^1$ generally is the aliphatic acid, or an alkyl ester thereof, which is desired as radical R.

In order to form a pyrrole, a compound of general Formula II can be heated in the presence of ammonia, urea or a primary amine $YNH_2$ or salt thereof, preferably by heating with ammonium acetate. This is a standard type of reaction for the preparation of pyrroles and may, for example, be carried out at temperatures of 70–100° C. In this reaction the radical $R^1$ preferably is an aliphatic acid group. On the other hand, in order to prepare a furan or thiophene from the compound of general Formula II, $R^1$ preferably is an ester of an aliphatic acid (e.g. the ethyl acetate), in which case the said compound either can be heated with a dehydrating and cyclising agent (preferably an acidic dehydrating agent such as sulphuric acid or a sulphonic acid or phosphorus pentoxide) to give the furan or can be heated with a sulphur-donating dehydrating and cyclising agent (preferably phosphorus pentasulphide or a mixture of hydrogen sulphide and a strong acid such as a hydrohalic acid) to give the thiophene. The ester group in the ensuing compound can be hydrolysed in standard manner to give the more preferred acid. An inert organic solvent, e.g. benzene or chloroform may be present when preparing the furan or thiophene.

The process for preparing the compounds of the invention is illustrated in more detail below, in which Ar, $Ar^1$, and $R^1$ have the meanings defined above, Hal is a halogen atom and HNAB is an amine (e.g. morpholine) used to form the enamine.

(1) The reaction of an enamine of Formula IIIa with a haloketone of Formula IIIb yields a 1,3-diaryl-1,4-dicarbonyl compound of Formula IIIc which is cyclised as described above to the 3,5-diaryl-2-$R^1$ product of Formula IIId.

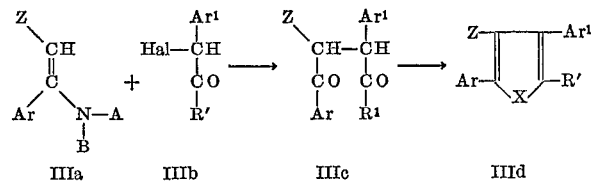

IIIa   IIIb   IIIc   IIId (2) In a similar manner, the reaction of an enamine of Formula IVa with a haloketone of Formula IVb yields a 1,4-diaryl-1,4-dicarbonyl compound of Formula IVc which is cyclised as described above to the 2,5-diaryl-3-$R^1$ product of Formula IVd.

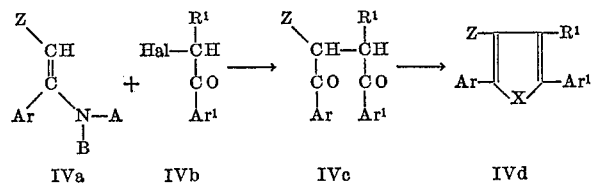

IVa   IVb   IVc   IVd

The 1,4-diaryl-1,4-dicarbonyl compounds of Formula IVc wherein Ar and $Ar^1$ are the same and $R^1$ represents the diethyl malonate residue (i.e.

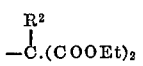

where $R^2$ is a hydrogen atom or a lower alkyl residue) can be prepared by Michael addition of the appropriate malonate to a dibenzoyl ethylene of Formula IVe. This may be cyclised to IVd wherein $R^1$ represents the diethyl malonate residue defined above, or hydrolysed and decarboxylated to give compounds of Formula IVc wherein $R^1$ now represents an acetic or substituted acetic acid residue and then cyclised to compounds of Formula IVd wherein $R^1$ is an acetic or substituted acetic acid residue.

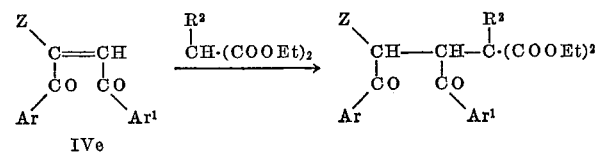

IVe

The 1,4-diaryl-1,4-dicarbonyl compounds of Formula IVc wherein Ar and $Ar^1$ are the same or different and $R^1$ is an alkoxycarbonyl residue can be prepared by alkylating a benzoylacetate of Formula IVf with a phenacylbromide of Formula IVg in the presence of metallic sodium.

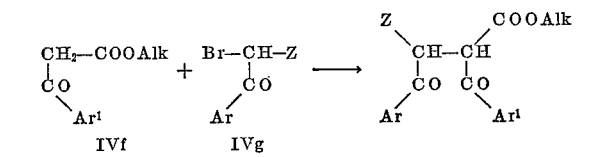

IVf   IVg (3) The reaction of an enamine of Formula Va with a haloketone of Formula Vb yields a 1,2-diaryl-1,4-dicarbonyl compound of Formula Vc which is cyclised as described above to the 2,3-diaryl-5-$R^1$ product of Formula Vd.

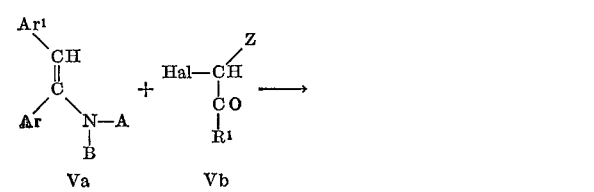

Va   Vb

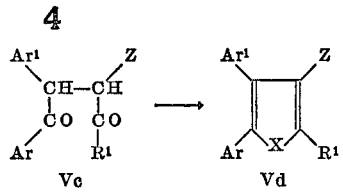

Vc   Vd (4) The reaction of an enamine of Formula VIa with a haloketone of Formula VIb yields a 2,3-diaryl-1,4-dicarbonyl compound of Formula VIc which is cyclised as described above to the 3,4-diaryl-2-$R^1$ product of Formula VId.

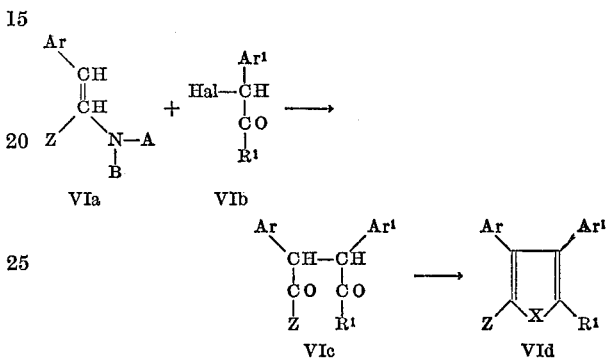

VIa   VIb

VIc   VId (5) Furthermore, the reaction of an enamine of Formula VIIa with a halo-carbonyl compound of Formula VIIb yields a 1,2-diaryl-1,4-dicarbonyl compound of Formula VIIc which is cyclised as described above to the 2,3-diaryl-4-R' product of Formula VIId

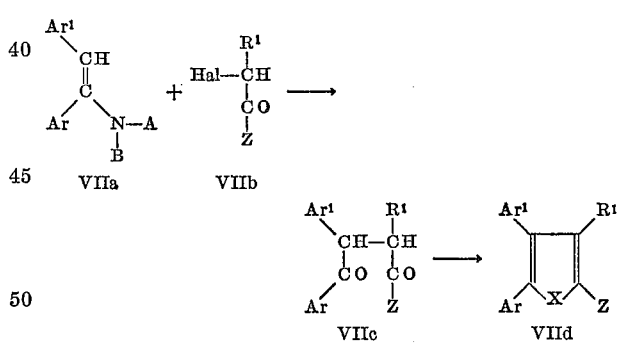

VIIa   VIIb

VIIc   VIId (6) The reaction of an enamine of Formula VIIIa with a haloketone of Formula VIIIb yields a 1,3-diaryl-1,4-dicarbonyl compound of Formula VIIIc which is cyclised as described above to the 2,4-diaryl-3-$R^1$ product of Formula VIIId.

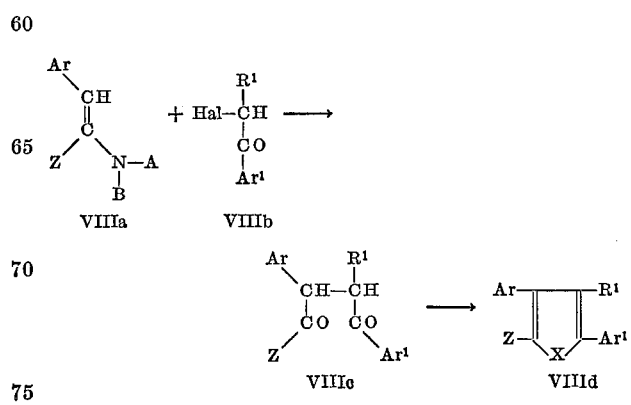

VIIIa   VIIIb

VIIIc   VIIId

The above reactions usually are carried out in solution in an inert organic solvent, by heating the reaction mixture. Solvents and reaction conditions known in the art for the preparation of furans, thiophenes and pyrroles can be used. The starting materials for the above processes are known and are commercially available, or can be prepared following methods known in the art for the preparation of compounds of that type.

Other generally less-preferred methods of preparation of compounds of general Formula I can also be used. For example a compound of the general formula:

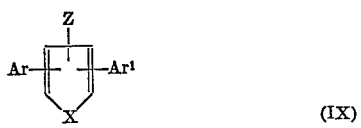

(IX)

can be prepared following one of the above methods (but with $R^1$ replaced by hydrogen) and then the radical $R^1$ can be introduced. Thus, a compound of general Formula I can be prepared from a compound of general Formula IX using a Reimer-Tiemann reaction, by treating the compound of general Formula IX with chloroform in a caustic alkali (e.g. potassium hydroxide) followed by acidification to give a compound substituted by a formyl group. The formyl group can be converted to a group of general formula R in a known manner, e.g. by reduction to a hydroxymethyl group followed by halogenation and reaction with a cyanide (e.g. potassium cyanide) to give a nitrile which may then be hydrolysed to the amide or acid. Alternatively, the formyl group can be condensed with a malonic ester and if necessary subsequent reduction carried out. Alternatively again, a compound of general Formula IX preferably when X is an S or O atom can be reacted at temperatures below ambient temperature with hydrogen cyanide in an inert solvent which is saturated or nearly saturated with a hydrogen halide; the aldehyde formed can then be converted to the acid in known manner. A further method involves oxidising the said aldehyde to the corresponding carboxyl radical by treatment with an alkali metal or alkaline earth metal hydroxide followed by an Arndt-Eistert reaction. Of course, any equivalent method of introducing an aliphatic acid group containing two to six carbon atoms into a furan, thiophene or pyrrole ring can be used.

As indicated above, if a compound is produced according to the invention in which the radical $R^1$ is a nitrile, this may be hydrolysed to the amide or acid. Alternatively, the acid may be esterified to give the ester, or the ester may be reacted with hydroxylamine to give the hydroxamic acid derivative. Generally the acid is required so that, if the ester is prepared, this may be hydrolysed.

If $R^1$ represents a diethyl malonate residue of formula

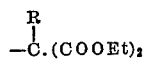

(wherein $R^2$ is a hydrogen atom or lower alkyl residue) this may be hydrolysed to the dicarboxylic acid which in turn can be decarboxylated to the acetic or substituted acetic acid.

Pyrrole compounds in which X is —NY— where Y is an alkyl, cycloalkyl, aralkyl, aryl or heteroaryl radical (any of which can be substituted), or an acyl residue, can be prepared from those in which X is —NH— by alkylation or acylation to introduce the desired group Y. If desired any other sensitive group in the molecule can be protected and the protecting group removed after the alkylation or acylation process. It is convenient to prepare N-alkyl, cycloalkyl, aralkyl, aryl or heteroaryl derivatives of the acidic molecules by first protecting the carboxyl group, for instance using an ethyl ester, carrying out the alkylation reaction and finally removing the protecting group. When preparing N-acyl derivatives of the acidic molecules, the carboxyl group is preferably protected by forming the t-butyl ester or benzyl ester these groups being finally removed by heating or catalytic hydrogenation respectively.

As the compounds of general Formula I show pharmaceutical activity, for example, anti-inflammatory activity, the invention provides a pharmaceutical composition comprising a compound of general Formula I, and a pharmaceutically acceptable carrier.

When the compounds of this invention are employed as anti-inflammatory agents they can be administered to warm-blooded animals, e.g. mice, rats, rabbits, dogs, cats, monkeys, etc. alone or as a pharmaceutical composition in combination with pharmaceutically aceptable carriers. The carrier may be solid, liquid or cream-like and any suitable carrier known to the art can be used. The composition can be in unit dose form, for example as tablets or capsules or it can be in the form of a solution. The compositions can be administered orally or parenterally by injection and the composition can, for parenteral administration, be in the form of a sterile solution or suspension containing other solutes, for example enough saline or glucose to render the solution isotonic. The particular carrier and proportion of carrier to active compound will be determined by the nature of the compound, and the chosen route of administration and standard pharmaceutical practice.

The dosage of the active compound will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects.

The following examples illustrate the invention:

EXAMPLE 1

2,5-diphenylpyrrole-3-acetic acid (a) 3,4-dibenzoylbutyric acid (200 mg.) is heated with ammonium acetate (1.0 g.) at 80–100° C. Initially, the mixture gives a clear melt but after 3 minutes, solidification occurs and heating is stopped. On cooling, water is added and the resulting solid is filtered off and recrystallised from aqueous acetic acid to give 2,5-diphenyl-pyrrole-3-acetic acid as needle crystals of M.P. 123–125° C.

(Found (percent): C, 78.3; H, 5.4; N, 4.9. $C_{18}H_{15}NO_2$ requires (percent): C, 78.0; H, 5.5; N, 5.1.)

(b) The 3,4-dibenzoylbutyric acid is prepared as follows: 1-(4'-morpholino)styrene (5.0 g.) and 3-benzoyl-3-bromopropionic acid (5.0 g.) are heated together in refluxing dioxane (50 ml.) for 2 hours. The mixture is cooled and poured into water, which is then acidified with concentrated hydrochloric acid (0.5 ml.). After 16 hours at room temperature, the mixture is extracted with ether. The ether solution is washed with 2 N hydrochloric acid solution, then with water and finally is extracted with 2 N sodium hydroxide solution. The basic solution is washed once with ether and then acidified with concentrated hydrochloric acid solution. The crystalline solid formed is filtered off and separated by chromatography to give a product M.P. 138° C. and the desired acid M.P. 148°–150° C.

In a similar manner the following starting materials give the products indicated:

| Starting materials | Products |
| --- | --- |
| 3,4-di-(p-chlorobenzoyl)butyric acid | 2,5-di-(p-chlorophenyl)pyrrole-3-acetic acid. |
| 3,4-di-(p-fluorobenzoyl)butyric acid | 2,5-di-(p-fluorophenyl)pyrrole-3-acetic acid. |
| 3,4-di-(m-trifluoromethylbenzoyl)butyric acid | 2,5-di-(m-trifluoromethylphenyl)pyrrole-3-acetic acid. |
| 3,4-di-(p-methoxybenzoyl)butyric acid | 2,5-di-(p-methoxyphenyl)pyrrole-3-acetic acid. |
| 3,4-di-(p-methylbenzoyl)butyric acid | 2,5-di-(p-methylphenyl)pyrrole-3-acetic acid. |
| 3-benzoyl-4-(p-chlorobenzoyl)butyric acid | 2-phenyl-5-(p-chlorophenyl)pyrrole-3-acetic acid. |
| 4-benzoyl-3-(p-chlorobenzoyl)butyric acid | 5-phenyl-2-(p-chlorophenyl)pyrrole-3-acetic acid. |
| 4,5-dibenzoylvaleric acid | β-(2,5-diphenylpyrrol-3-yl)propionic acid. |
| 3,4-di-(p-dimethylaminobenzoyl)butyric acid | 2,5-di-(p-dimethylaminophenyl)pyrrole-3-acetic acid. |
| 3-benzoyl-4-(p-nitrobenzoyl)butyric acid | 5-(p-nitrophenyl)-2-phenylpyrrole-3-acetic acid. |
| 3-benzoyl-4-(naphth-1-yl)butyric acid | 5-(naphth-1-yl)-2-phenylpyrrole-3-acetic acid. |
| 3-benzoyl-4-(naptho-2-yl)butyric acid | 5-(naphth-2-yl)-2-phenylpyrrole-3-acetic acid. |
| 3-benzoyl-4-(furo-3-yl)butyric acid | 5-(fur-3-yl)-2-phenylpyrrole-3-acetic acid. |
| 3-benzoyl-4-(theno-3-yl)butyric acid | 2-phenyl-5-(thien-3-yl)pyrrole-3-acetic acid. |
| 3-benzoyl-4-(pyrid-2-ylcarbonyl)butyric acid | 2-phenyl-5-(pyrid-2-yl)pyrrole-3-acetic acid. |
| 3-benzoyl-4-(pyrid-3-ylcarbonyl)butyric acid | 2-phenyl-5-(pyrid-3-yl)pyrrole-3-acetic acid. |
| 3-benzoyl-4-(pyrid-4-ylcarbonyl)butyric acid | 2-phenyl-5-(pyrid-4-yl)pyrrole-3-acetic acid. |
| 3,4-di-(furo-2-yl)butyric acid | 2,5-di-(fur-2-yl)pyrrole-3-acetic acid. |
| 3,4-di-(theno-2-yl)butyric acid | 2,5-di-(thien-2-yl)pyrrole-3-acetic acid. |

EXAMPLE 2

2,5-diphenylfuran-3-acetic acid (a) 3,4 - dibenzoylbutyric acid is converted into its methyl ester by treatment with diazomethane in ether. Subsequent reaction with phosphorus pentoxide in benzene solution gives the methyl ester of the title acid.

(b) Hydrolysis of the ester of part (a) with sodium hydroxide gives the title acid of M.P. 134–135° C.

In a similar manner the following starting materials give the products indicated:

| Starting materials | Products |
| --- | --- |
| 3,4-di-(p-chlorobenzoyl)butyric acid | 2,5-di-(p-chlorophenyl)furan-3-acetic acid. |
| 3,4-di-(p-fluorobenzoyl)butyric acid | 2,5-di-(p-fluorophenyl)furan-3-acetic acid. |
| 3,4-di-(m-trifluoromethylbenzoyl)butyric acid | 2,5-di-(m-trifluoromethylphenyl)furan-3-acetic acid. |
| 3,4-di-(p-methoxybenzoyl)butyric acid | 2,5-di-(p-methoxyphenyl)furan-3-acetic acid. |
| 3,4-di-(p-methylbenzoyl)butyric acid | 2,5-di-(p-methylphenyl)furan-3-acetic acid. |
| 3-benzoyl-4-(p-chlorobenzoyl)butyric acid | 2-phenyl-5-(p-chlorophenyl)furan-3-acetic acid. |
| 4-benzoyl-3-(p-chlorobenzoyl)butyric acid | 5-phenyl-2-(p-chlorophenyl)furan-3-acetic acid. |
| 4,5-dibenzoylvaleric acid | β-(2,5-diphenylfur-3-yl)propionic acid. |

EXAMPLE 3

2,5-diphenylthiophene-3-acetic acid (a) 3,4 - dibenzoylbutyric acid is converted into its methyl ester by treatment with diazomethane in ether. Subsequent reaction of 10.0 g. of this ester with phosphorus pentasulphide (20.0 g.) in benzene solution (50 ml.) gives the methyl ester of the title acid.

(b) Hydrolysis of the ester of part (a) with sodium hydroxide gives the title acid.

In a similar manner the following starting materials give the products indicated:

| Starting materials | Products |
| --- | --- |
| 3,4-di-(p-chlorobenzoyl)butyric acid | 2,5-di-(p-chlorophenyl)thiophene-3-acetic acid. |
| 3,4-di-(p-fluorobenzoyl)butyric acid | 2,5-di-(p-fluorophenyl)thiophene-3-acetic acid. |
| 3,4-di-(m-trifluoromethylbenzoyl)butyric acid | 2,5-di-(m-trifluoromethylphenyl)thiophene-3-acetic acid. |
| 3,4-di-(p-methoxybenzoyl)butyric acid | 2,5-di-(p-methoxyphenyl)thiophene-3-acetic acid. |
| 3,4-di-(p-methylbenzoyl)butyric acid | 2,5-di-(p-methylphenyl)thiophene-3-acetic acid. |
| 3-benzoyl-4-(p-chlorobenzoyl)butyric acid | 2-phenyl-5-(p-chlorophenyl)thiophene-3-acetic acid. |
| 4-benzoyl-3-(p-chlorobenzoyl)butyric acid | 5-phenyl-2-(p-chlorophenyl)thiophene-3-acetic acid. |
| 4,5-dibenzoylvaleric acid | β-(2,5-diphenylthien-3-yl)propionic acid. |

EXAMPLE 4

Ethyl 3,5-diphenylpyrrole-2-acetate (a) The morpholino enamine of acetophenone [i.e. 1-(4'-morpholino)styrene] is treated with ethyl 4-bromo-4-phenylacetoacetate in a manner similar to that described in Example 1b to give ethyl 3,6-dioxo-4,6-diphenylhexanoate.

(b) The ester of part (a) was reacted with ammonium acetate by the procedure of Example 1a to give the title pyrrole ester.

EXAMPLE 5

Ethyl 3,5-diphenylfuran-2-acetate

Ethyl 3,6-dioxo - 4,6 - diphenylhexanoate (1.5 g.) is heated under reflux for 2 hours with phosphorus pentoxide (1.0 g.) in benzene (50 ml.). The organic solution is then decanted and evaporated to give the title furan ester.

EXAMPLE 6

Ethyl 3,5-diphenylthiophene-2-acetate

Ethyl 3,6-dioxo-4,6-diphenylhexanoate is heated with phosphorus pentasulphide in benzene to give the title thiophene ester.

EXAMPLE 7

3,4-diphenylpyrrole-2-propionic acid (a) The pyrrolidino enamine of phenylacetaldehyde [i.e. 2-(1'-pyrrolidino)styrene] is reacted with ethyl 5-bromo-4-oxo-5-phenylvalerate in a similar manner to that described in Example 1b to give ethyl 4,7-dioxo-5,6-diphenylheptoate.

(b) The ester of part (a) is hydrolysed to the corresponding acid and is then treated with ammonium acetate as described in Example 1a to give the title pyrrole acid.

EXAMPLE 8

3,4-diphenylfuran-2-propionic acid (a) Ethyl 4,7-dioxo - 5,6 - diphenylheptoate (8.0 g.) is heated under reflux for 3 hours with phosphorus pentoxide (6.0 g.) in benzene (100 ml.). The organic layer is then decanted and evaporated to give the ethyl ester of the title acid.

(b) The ester of part (a) in ethanol is warmed to 50° C. and treated with a solution of potassium hydroxide (3.0 g.) in water (10 ml.). Evaporation of the solution, dissolution of the residue in water and acidification gives the title furan acid.

EXAMPLE 9

3,4-diphenylthiophene-2-propionic acid

The method of Example 8 is repeated but using phosphorus pentasulphide instead of phosphorus pentoxide to give the title thiophene acid.

EXAMPLE 10

2,3-diphenylpyrrole-5-propionic acid (a) The reaction of the morpholino enamine of deoxybenzoin and methyl 5-bromo-4-oxo-valerate by the method of Example 1b gives methyl 4,7-dioxo-6,7-diphenylheptoate.

(b) Methyl 4,7-dioxo-6,7-diphenylheptoate is hydrolysed to the corresponding acid and is then heated with ammonium acetate as described in Example 1a to give the title pyrrole acid.

EXAMPLE 11

2,3-diphenylfuran-5-propionic acid (a) Methyl 4,7-dioxo-6,7-diphenylheptoate is heated at 100° C. with phosphorus pentoxide to give the methyl ester of the title acid.

(b) Hydrolysis of the ester of part (a) with sodium hydroxide gives the title furan acid.

EXAMPLE 12

2,3-diphenylthiophene-5-propionic acid (a) Methyl 4,7-dioxo-6,7-diphenylheptoate is heated at 100° C. with phosphorus pentasulphide to give the methyl ester of the title acid.

(b) Hydrolysis of the ester of part (a) with sodium hydroxide gives the title thiophene acid.

EXAMPLE 13

Ethyl 2,3-diphenylpyrrole-4-acetate (a) The morpholino enamine of deoxybenzoin is reacted with ethyl 3-bromo-4-oxobutyrate in a manner similar to that described in Example 1b to give ethyl 4,5-diphenyl-3-formyl-5-oxovalerate.

(b) Ethyl 4,5-diphenyl-3-formyl-5-oxovalerate (4.0 g.) is heated with ammonium acetate (20 g.) at 100° C. for 0.25 hour. Addition of water to the cooled melt and filtration of the solid gives the title pyrrole ester.

EXAMPLE 14

Ethyl 2,3-diphenylfuran-4-acetate

Ethyl 4,5-diphenyl-3-formyl-5-oxovalerate is heated with phosphorus pentoxide in benzene for 2 hours to give the title furan ester.

EXAMPLE 15

2,3-diphenylthiophene-4-acetic acid (a) Ethyl 4,5-diphenyl-3-formyl-5-oxovalerate is heated with phosphorus pentasulphide to give the ethyl ester of the title acid.

(b) Hydrolysis of the ester of part (a) with sodium hydroxide gives the title thiophene acid.

EXAMPLE 16

2,5-diphenylpyrrole-3-acetic acid

A mixture of 3,4-dibenzoylbutyric acid (4.0 g.), ammonium acetate (20.0 g.) and glacial acetic acid (20 ml.) is heated under reflux for 1 hour. Pouring the solution into water, extracting with ether and evaporating the organic extract gives a residue which is recrystallised from benzene/petroleum ether to give the title acid of M.P. 123–125° C.

EXAMPLE 17

2,5-di-(p-chlorophenyl)pyrrole-3-acetic acid (a) Diethyl αβ-di-(p-chlorobenzoyl)ethylmalonate is prepared by heating under reflux for 19 hours, a mixture of 1,2-di-(p-chlorobenzoyl)ethylene (96.3 g.), diethyl malonate (48.5 ml.), piperidine (6.0 ml.) and absolute ethyl alcohol (300 ml.). Evaporation under reduced pressure affords a red coloured oily residue which on dissolution in ether and treating with aqueous hydrochloric acid gives 104.7 g. (71%) of the diester of M.P. 111–112° C. after recrystallisation from ethyl alcohol.

(Found (percent): C, 59.7; H, 4.6. $C_{23}H_{22}Cl_2O_6$ requires (percent): C, 59.4; H, 4.8.)

(b) αβ-Di-(p-chlorobenzoyl)ethylmalonic acid is prepared by heating under reflux for 2 hours, a mixture of the diester (50 g.) of Example 17a and 2 N aqueous sodium hydroxide solution (100 ml.). Evaporation of the solution gives a residue which is shaken with a mixture of ether and water. Acidification of the aqueous layer gives an oil which after extracting into ether, washing, drying and evaporating gives the di-acid (59.2 g.) as an oil which is used for the next stage without purification.

(c) 3,4-di-(p-chlorobenzoyl)butyric acid is prepared by refluxing for 2 hours, a solution of the di-acid (59.2 g.) of Example 17b in dimethylformamide (30 ml.) and then pouring into water (1.5 litre). An oil is precipitated which after extraction into ether, washing with water, drying (MgSO₄) and evaporating gives a brown coloured oil. This oil, which crystallises after a few hours, gives 33.1 g. (67.2%) of the butyric acid which has M.P. 96–97° C.

(d) The acid (10.0 g. of Example 17c and ammonium acetate (20.0 g.) in glacial acetic acid (20 ml.) is heated under reflux for 1 hour. Pouring the solution into water (2 litres) gives a pink coloured solid, recrystallisation of which from benzene affords 7.08 g. (74.5%) of the title pyrrole of M.P. 163–166° C.

(Found (percent): C, 62.4; H, 3.7; N, 3.8. $C_{18}H_{13}Cl_2NO_2$ requires (percent): C, 62.5; H, 3.8; N, 4.1.)

EXAMPLE 18

2,5-di-(p-fluorophenyl)pyrrole-3-acetic acid (a) 1,2-di-(p-fluorobenzoyl)ethylene is prepared by adding dropwise fumaryl chloride (35.2 g., 25 ml.) to a mixture of fluorobenzene (250 ml.) and finely powdered aluminium chloride (80 g.) with stirring and warming to 60° C. The dark red solution is then heated at 70° C. for 0.5 hour followed by pouring into a mixture of ice and concentrated hydrochloric acid (20 ml.). The precipitated solid is extracted into methylene chloride followed by washing with dilute hydrochloric acid, water, drying (MgSO₄) and evaporating which gives an oily residue. Crystallisation from ethyl alcohol affords 44.2 g. (69.5%) of the substituted ethylene, which has M.P. 163–164° C.

(Found (percent): C, 70.7; H, 3.7. $C_{16}H_{10}F_2O_2$ requires (percent): C, 70.65; H, 3.7.)

(b) Diethyl αβ-di-(p-fluorobenzoyl)ethylmalonate is prepared by the method of Example 17a using 1,2-di-(p-fluorobenzoyl)ethylene (42.3 g.), diethyl malonate (24.6 ml.), piperidine (3.0 ml.) and absolute ethyl alcohol (150 ml.). The crude oil (50.0 g.) is used for the next stage without purification.

(c) αβ-Di-(p-fluorobenzoyl)ethylmalonic acid is prepared by the method of Example 17b using 50.0 g. of the crude diester of Example 18b and 2 N aqueous sodium hydroxide (100 ml.). The oily product (39.0 g.) is used for the next stage without purification.

(d) 3,4-di-(p-fluorobenzoyl)butyric acid is prepared by the method of Example 17c using the di-acid (39.0 g.) of Example 18(c) and dimethylformamide (30 ml.). This oil is again used for the next stage without purification.

(e) The title pyrrole is prepared by the method of Example 17d using the butyric acid (16.6 g.) of Example 18d, ammonium acetate (14.0 g.) and glacial acetic acid (30 ml.). The product (2.7 g.) after recrystallisation from a mixture of benzene and petroleum ether has M.P. 143–144° C.

(Found (percent): C, 68.6; H, 3.9; N, 4.3. $C_{18}H_{13}F_2NO_2$ requires (percent): C, 69.0; H, 4.2; N, 4.5.)

EXAMPLE 19

2,5-di-(p-methoxyphenyl)pyrrole-3-acetic acid

A mixture of 3,4-di-(p-methoxybenzoyl) butyric acid (4.2 g.), glacial acetic acid (10 ml.) and ammonium acetate (4.5 g.) is heated under reflux for 1 hour and then worked up as described in Example 17d to give the title compound.

(Found (percent): C, 71.3; H, 5.65; N, 4.05. $C_{20}H_{19}NO_4$ requires (percent): C, 71.3; H, 5.7; N, 4.2.)

EXAMPLE 20

2,5-di-(p-tolyl)pyrrole-3-acetic acid

A mixture of 3,4-di-(p-methylbenzoyl)butyric acid (33.3 g.), glacial acetic acid (60 ml.) and ammonium acetate (34.05 g.) is heated under reflux for 1 hour and then worked up as described in Example 17d to give the title acid.

EXAMPLE 21

2,5-diphenylfuran-3-acetic acid (a) A mixture of 10.0 g. of diethyl αβ-dibenzoylethylmalonate [prepared by the method of Example 17a], phosphoric oxide (50.0 g.) and dry benzene (250 ml.) is heated under reflux for 1 hour. The solvent is then decanted from the solid material after which the solid is treated with water and benzene. Separating the benzene layer, washing with water, drying (MgSO$_4$) and evaporating affords the furan-diester (5.35 g.) as an oil which is used for the next stage.

(b) The above furan-diester (5.35 g.) and 2 N aqueous sodium hydroxide solution (50 ml.) is heated on a steambath for 0.5 hour and the ethanol produced is evaporated. The aqueous solution is washed with ether and after treating with charcoal it is acidified with concentrated hydrochloric acid. Filtering off the solid, drying and recrystallising from benzene gives 2.75 g. of the furan di-acid of M.P. 143–144° C.

(Found (percent): C, 70.1; H, 4.3. $C_{19}H_{14}O_5$ requires (percent): C, 70.8; H, 4.4.)

(c) Heating under reflux for 1 hour a solution of the above di-acid (2.55 g.) in dimethylformamide (10 ml.) and then pouring into water (500 ml.) gives a precipitate which is extracted into ether and after washing several times with water is extracted with saturated aqueous sodium hydrogen carbonate solution. The basic extract is decolourised with charcoal and after filtering is acidified to give a colourless precipitate which is filtered off and dried. Recrystallisation from a mixture of benzene and petroleum ether (B.P. 40–60° C. affords 0.77 g. of the title furan acetic acid of M.P. 134–135° C.

(Found (percent): C, 77.2; H, 5.0. $C_{18}H_{14}O_3$ requires (percent): C, 77.4; H, 5.1.)

EXAMPLE 22

2,5-di-(p-chlorophenyl)furan-3-acetic acid

This compound is prepared by the procedure of Example 21, starting from 30.0 g. of the diester of Example 17a. Recrystallisation of the crude acid from benzene affords 16.3 g. of the title compound of M.P. 153–154° C.

(Found (percent): C, 62.6; H, 3.6. $C_{18}H_{12}Cl_2O_3$ requires (percent): C, 62.3; H, 3.5.)

EXAMPLE 23

2,5-di-(p-fluorophenyl)furan-3-acetic acid

A solution of 6.8 g. of the crude acid of Example 18d in glacial acetic acid (30 ml.) containing a few drops of concentrated sulphuric acid is heated under reflux for 1 hour and then cooled. Addition of water gives a solid which is filtered off, washed with water and dried. Recrystallisation from benzene affords 4.48 g. of the title acid of M.P. 160–161° C.

(Found (percent): C, 69.0; H, 3.85. $C_{18}H_{12}F_2O_3$ requires (percent): C, 68.85; H, 3.85.)

EXAMPLE 24

2,5-di-(p-methoxyphenyl)furan-3-acetic acid

A mixture of 3,4-di-(p-methoxybenzoyl)butyric acid (4.0 g.), glacial acetic acid (10 ml.) and concentrated sulphuric acid (1 drop) is heated under reflux for 1 hour and then worked up as described in Example 23. Recrystallisation from benzene gives the title acid.

(Found (percent): C, 77.4; H, 5.5. $C_{20}H_{18}O_5$ requires (percent): C, 71.1; H, 5.4.)

EXAMPLE 25

2,5-di-(p-tolyl)furan-3-acetic acid

A mixture of 3,4-di-(p-methylbenzoyl)butyric acid (15.55 g.) glacial acetic acid (60 ml.) and concentrated sulphuric acid (5 drops) is heated under reflux for 1 hour and then worked up as described in Example 23. Recrystallisation from a mixture of benzene and petroleum ether gives 2.67 g. of the title acid of M.P. 142–143° C.

(Found (percent): C, 78.4; H, 5.9. $C_{20}H_{18}O_3$ requires (percent): C, 78.4; H, 5.9.)

EXAMPLE 26

Ethyl 3,5-diphenylpyrrole-2-acetate (a) The morpholino enamine of acetophenone [i.e. 1-(4'-morpholino)styrene] is treated with ethyl 4-bromo-4-phenylacetoacetate in a manner similar to that described in Example 1b to give ethyl 3,6-dioxo-4,6-diphenylhexanoate.

(b) Heating ethyl 3,6-dioxo-4,6-diphenylhexanoate with ammonium acetate in glacial acetic acid according to the method of Example 17d gives the title pyrrole ester.

EXAMPLE 27

3,5-diphenylpyrrole-2-acetic acid

The pyrrole ester (5.0 g.) of Example 26b in ethanol (50 ml.) is treated with a solution of potassium hydroxide (3.0 g.) in water (10 ml.) and is then warmed to 50° C. for 0.5 hour. The excess of alcohol is removed under reduced pressure and the residue is dissolved in water (50 ml.). Acidification with hydrochloric acid precipitates the title acid which is filtered off and dried.

EXAMPLE 28

Ethyl 3,5-diphenylfuran-2-acetate

Heating ethyl 3,6-dioxo-4,6-diphenylhexanoate [prepared by method of Example 26a] with glacial acetic acid and concentrated sulphuric acid according to the method of Example 23 gives the title furan ester.

EXAMPLE 29

3,5-diphenylfuran-2-acetic acid

The furan ester of Example 28 is hydrolysed with potassium hydroxide as described in Example 27 to give the title acid.

EXAMPLE 30

Ethyl 3,5-diphenylthiophene-2-acetate

Cyclising ethyl 3,6-dioxo-4,6-diphenylhexanoate [prepared by method of Example 26a] in chloroform solution with hydrogen chloride and hydrogen sulphide gives the title thiophene ester.

EXAMPLE 31

3,5-diphenylthiophene-2-acetic acid

Hydrolysis of the ester of Example 30 with potassium hydroxide by the method of Example 27 gives the title thiophene acid.

EXAMPLE 32

3,4-diphenylpyrrole-2-propionic acid (a) The pyrrolidino enamine of phenylacetaldehyde [i.e. 2-(1'-pyrrolidino)styrene] is reacted with ethyl 5-bromo-4-oxo-5-phenylvalerate in a similar manner to that described in Example 1b to give ethyl 4,7-dioxo-5,6-diphenylheptoate.

(b) Ethyl 4,7-dioxo-5,6-diphenylheptoate is hydrolysed to the corresponding acid and then treated with ammonium acetate in glacial acetic acid by the method described in Example 17d to give the title pyrrole acid.

EXAMPLE 33

Ethyl 3,4-diphenylfuran-2-propionate

Heating ethyl 4,7-dioxo-5,6-diphenylheptoate [prepared by method of Example 32a] with glacial acetic acid and concentrated sulphuric acid by the method of Example 23 gives the title furan ester.

EXAMPLE 34

3,4-diphenylfuran-2-propionic acid

The furan ester of Example 33 is hydrolysed with potassium hydroxide as described in Example 27 to give the title acid.

EXAMPLE 35

Ethyl 3,4-diphenylthiophene-2-propionate

Cyclising ethyl 4,7-dioxo-5,6-diphenylheptoate [prepared by method of Example 32a] in chloroform solution with hydrogen chloride and hydrogen sulphide gives the title thiophene ester.

EXAMPLE 36

3,4-diphenylthiophene-2-propionic acid

Hydrolysis of the ester of Example 35 with potassium hydroxide by the method of Example 27 gives the title thiophene acid.

EXAMPLE 37

2,4-diphenylpyrrole-3-acetic acid (a) The pyrrolidino enamine of phenylacetaldehyde [i.e. 2-(1'-pyrrolidino)-styrene] is reacted with β-benzoyl-β-bromopropionic acid in a similar manner to that described in Example 1b to give 3-benzoyl-5-oxo-4-phenylvaleric acid.

(b) Heating 3-benzoyl-5-oxo-4-phenylvaleric acid in glacial acetic acid with ammonium acetate by the method described in Example 17d gives the title pyrrole acid.

EXAMPLE 38

2,4-diphenylfuran-3-acetic acid

Heating 3-benzoyl-5-oxo-4-phenylvaleric acid with glacial acetic acid and concentrated sulphuric acid by the method of Example 23 gives the title furan acid.

EXAMPLE 39

Ethyl 2,4-diphenylthiophene-3-acetate (a) Ethyl 3-benzoyl-5-oxo-4-phenylvalerate is prepared by the method of Example 1b using ethyl β-benzoyl β-bromopropionate and the pyrrolidino enamine of phenylacetaldehyde [i.e. 2-(1'-pyrrolidino)styrene].

(b) Cyclisation of ethyl 3-benzoyl-5-oxo-4-phenylvalerate in chloroform solution with hydrogen chloride and hydrogen sulphide gives the title thiophene ester.

EXAMPLE 40

2,4-diphenylthiophene-3-acetic acid

Hydrolysis of the ester of Example 37 with potassium hydroxide by the method of Example 27 gives the title thiophene acid.

EXAMPLE 41

2,3-diphenylpyrrole-4-acetic acid

Hydrolysis of the ester of Example 13b with potassium hydroxide by the method described in Example 27 gives the title pyrrole acid.

EXAMPLE 42

Ethyl 2,3-diphenylfuran-4-acetate

Heating ethyl 4,5-diphenyl - 3 - formyl-5-oxovalerate [prepared by the method of Example 13a] with concentrated sulphuric acid in glacial acetic acid by the method of Example 23 gives the title furan ester.

EXAMPLE 43

2,3-diphenylfuran-4-acetic acid

Hydrolysis of the ester of Example 42 with potassium hydroxide by the method of Example 27 gives the title furan acid.

EXAMPLE 44

Ethyl 2,3-diphenylthiophene-4-acetate

Cyclising ethyl 4,5 - diphenyl-3-formyl-5-oxovalerate [prepared by the method of Example 13a] in chloroform solution with a mixture of hydrogen chloride and hydrogen sulphide gives the title thiophene ester.

EXAMPLE 45

2,3-diphenylthiophene-4-acetic acid

Hydrolysis of the ester of Example 44 with potassium hydroxide according to the method of Example 27 gives the title thiophene acid.

EXAMPLE 46

2,3-diphenylpyrrole-5-propionic acid (a) The reaction of the morpholino enamine of deoxybenzoin and methyl-5-bromo-4-oxovalerate by the method of Example 1b gives methyl 4,7-dioxo-6,7-diphenylheptoate.

(b) Methyl 4,7-dioxo-6,7-diphenylheptoate is hydrolysed to the corresponding acid and then heated with ammonium acetate in glacial acetic acid to give the title pyrrole acid.

EXAMPLE 47

Methyl 2,3-diphenylfuran-5-propionate

Methyl 4,7-dioxo-6,7-diphenylheptoate is cyclised in a mixture of glacial acetic acid and concentrated sulphuric acid by the method of Example 23 to give the title furan ester.

EXAMPLE 48

2,3-diphenylfuran-5-propionic acid

Hydrolysis of the ester of Example 50 using potassium hydroxide by the procedure of Example 27 gives the title furan acid.

EXAMPLE 49

Methyl 2,3-diphenylthiophene-5-propionate

Cyclising methyl 4,7-dioxo-6,7-diphenylheptoate in chloroform solution with a mixture of hydrogen chloride and hydrogen sulphide gives the title thiophene ester.

EXAMPLE 50

2,3-diphenylthiophene-5-propionic acid

Hydrolysis of the ester of Example 49 using potassium hydroxide by the procedure described in Example 27 gives the title thiophene acid.

EXAMPLE 51

5-(p-aminophenyl)-2-phenylpyrrole-3-acetic acid.

The corresponding p-nitro compound of Example 1 is reduced with hydrogen in the presence of palladium on charcoal catalyst to give the title pyrrole acid.

EXAMPLE 52

α[2,5-di-(p-chlorophenyl)pyrrol-3-yl]-α-methylacetic acid

The title compound is prepared in a similar manner to that described in Example 17 except that diethyl methylmalonate is used for the Michael reaction instead of diethyl malonate.

EXAMPLE 53

2,5-di-(p-chlorophenyl)furan-3-acetamide

The furan acetic acid of Example 22 is converted into the acid chloride by treatment with thionyl chloride. Subsequent treatment with ammonium gives the title amide.

EXAMPLE 54

2,5-di-(p-chlorophenyl)furan-3-acethydroxamic acid

The furan acetic acid of Example 22 is esterified with hydrogen chloride in ethyl alcohol and the ester subsequently treated with hydroxylamine to give the title hydroxamic acid.

EXAMPLE 55

2,5-diphenyl-4-methylpyrrole-3-acetic acid (a) 1,2-dibenzoyl-1-methylethylene is prepared by adding dropwise mesaconyl dichloride to a mixture of benzene and finely powdered aluminium chloride with stirring and warming to 60° C. The solution is then heated at 70° C. for 0.5 hour followed by pouring into a mixture of ice and concentrated hydrochloric acid. The mixture is extracted with methylene chloride and the extract is washed with dilute hydrochloric acid and water. Drying over magnesium sulphate and evaporating gives the substituted ethylene.

(b) Diethyl αβ-dibenzoylpropylmalonate is prepared by the method of Example 17a using 1,2-dibenzoyl-1-methylethylene, diethyl malonate, piperidine and ethyl alcohol.

(c) αβ-Dibenzoylpropylmalonic acid is prepared by the method of Example 17b using the diester of part (b) and aqueous sodium hydroxide.

(d) 3,4-dibenzoylvaleric acid is prepared by the method of Example 17c using the di-acid of part (c) and dimethylformamide.

(e) The title pyrrole acid is prepared by the method of Example 17d using the valeric acid of part (d), ammonium acetate and glacial acetic acid.

EXAMPLE 56

2,5-di-(p-chlorophenyl)-N-phenylpyrrole-3-acetic acid

A mixture of 5.56 g. of the diketo-acid of Example 17c, aniline (1.86 g.) and p-toluenesulphonic acid (50 mg.) in toluene (50 ml.) is heated under reflux for 1 hour using a Dean and Stark water separator. The mixture is then cooled and the solid filtered off and dried to give 4.0 g. of the title pyrrole acid.

(Found (percent): C, 68.1; H, 4.1; N, 3.4.

$C_{24}H_{17}Cl_2NO_2$ requires (percent): C, 68.2; H, 4.3; N, 3.3.)

In a similar manner the following amines give the products indicated:

| Amine | Product |
|---|---|
| p-Chloroaniline | 1,2,5-tri-(p-chlorophenyl)pyrrole-3-acetic acid. |
| m-Trifluoromethylaniline | 2,5 - di - (p - chlorophenyl) - N - (m - trifluoromethylphenyl)pyrrole-3-acetic acid. |
| p-Methoxyaniline | 2,5 - di - (p-chlorophenyl) - N - (p-methoxyphenyl)pyrrole-3-acetic acid. |
| p-Toluidine | 2,5 - di - (p - chlorophenyl) - N - (p - tolyl) - pyrrole-3-acetic acid. |
| p-Nitroaniline | 2,5 - di - (p - chlorophenyl) - N - (p - nitrophenyl)pyrrole-3-acetic acid. |
| p-Dimethylaminoaniline | 2,5 - di - (p - chlorophenyl) - N - (p - dimethylaminophenyl)pyrrole - 3 - acetic acid. |
| 4-aminopyridine | 2,5 - di - (p - chlorophenyl) - N - (pyrid-4-yl)pyrrole-3-acetic acid. |
| Benzylamine | N - benzyl - 2,5 - di - (p - chlorophenyl) - pyrrole-3-acetic acid. |
| Cyclohexylamine | N - cyclohexyl - 2,5 - di - (p - chlorophenyl) - pyrrole-3-acetic acid. |

EXAMPLE 57

2,5-di-(p-chlorophenyl)-1-methylpyrrole-3-acetic acid

A mixture of 3,4-di-(p-chlorobenzoyl)butyric acid (5.0 g.), methylammonium chloride (2.5 g.), sodium acetate (2.5 g.) and glacial acetic acid (25 ml.) is heated under reflux for 1.5 hours and the sodium chloride is filtered off after cooling the mixture. The filtrate is poured into water (200 ml. which after filtering off the solid, drying and recrystallising from benzene gives 2.0 g. of the title compound.

(Found (percent): C, 63.6; H, 4.15; N, 3.9.

$C_{19}H_{15}Cl_2NO_2$ requires (percent): C, 63.35; H, 4.2; N, 3.9.)

EXAMPLE 58

N-(p-chlorobenzoyl)-2,5-di-p-fluorophenyl)pyrrole-3-acetic acid (a) A solution of 2,5 - di - (p-fluorophenyl)pyrrole-3-acetic acid in tetrahydrofuran is treated with cyclohexylcarbodiimide to give the corresponding anhydride. Reacting this anhydride with tert-butyl alcohol in the presence of zinc chloride gives tert-butyl 2,5-di-(p-fluorophenyl)-pyrrole-3-acetate.

(b) The tert-butyl ester of part (a) is converted into its alkali metal derivative and subsequently treated with p-chlorobenzoyl chloride to give tert-butyl N-(p-chlorobenzoyl)-2,5-di-(p-fluorophenyl)-pyrrole-3-acetate.

(c) The ester of part (b) is heated to 200° C. with powdered porous plate to give the title acid.

In a similar maner, the following acid halides give the products indicated:

| Acid halide | Product |
|---|---|
| Acetyl chloride | N-acetyl-2.5-di-(p-fluorophenyl)pyrrole-3-acetic acid. |
| Cyclohexylcarbonyl chloride. | N-cyclohexylcarbonyl-2,5-di-(p-fluorophenyl)pyrrole-3-acetic acid. |
| Phenylacetyl chloride | N-phenylacetyl-2,5-di-(p-fluorophenyl)pyrrole-3-acetic acid. |
| Benzoyl chloride | N-benzoyl-2,5-di-(p-fluorophenyl)pyrrole-3-acetic acid. |
| p-Methylbenzoyl chloride | N-(p-methylbenzoyl)-2,5-di-(p-fluorophenyl)pyrrole-3-acetic acid. |
| p-Methoxybenzoyl chloride. | N-(p-methoxybenzoyl)-2,5-di-(p-fluorophenyl)pyrrole-3-acetic acid. |
| p-Nitrobenzoyl chloride | N-(p-nitrobenzoyl)-2,5-di-(p-fluorophenyl)pyrrole-3-acetic acid. |
| p-Dimethylaminobenzoyl chloride. | N-(p-dimethylaminobenzoyl)-2,5-di-(p-fluorophenyl)pyrrole-3-acetic acid. |
| m-Trifluoromethylbenzoyl chloride. | N-(m-trifluoromethylbenzoyl)-2,5-di-(p-fluorophenyl)pyrrole-3-acetic acid. |
| 1-naphthoyl chloride | N-(1'-naphthoyl)-2,5-di-(p-fluorophenyl)pyrrole-3-acetic acid. |
| 2-furoyl chloride | N-(2'-furoyl)-2,5-di-)p-fluorophenyl)pyrrole-3-acetic acid. |
| 2-thenoyl chloride | N-(2'-thenoyl)-2,5-di-(p-fluorophenyl)pyrrole-3-acetic acid. |
| 4-pyridylcarbonyl chloride | N-(4'-pyridylcarbonyl)-2,5-di-(p-fluorophenyl)pyrrole-3-acetic acid. |
| 2-pyrrylcarbonyl chloride | N-(2'-pyrrylcarbonyl)-2,5-di-(p-fluorophenyl)pyrrole-3-acetic acid. |

EXAMPLE 59

N-(p-aminobenzoyl)-2,5-di-(p-fluorophenyl)pyrrole-3-acetic acid

The p-nitro compound of Example 58 is reduced with hydrogen in the presence of palladium on charcoal catalyst to give the title pyrrole acid.

In the pharmacological evaluation of the properties of the compounds of this invention, the effects in vivo of the compounds are tested in the procedure of Winter et al. in Proc. Soc. Biol. Med., 111, 544 (1962) and Buttle et al. in Nature, 179, 629 (1957).

The compounds of General Formula I when administered orally in the above test procedure at a dosage of 10 to 250 mg./kg. depending on the compound in question, demonstrate anti-inflammatory activity.

Good activity was obtained with 2,5-di-(p-methoxyphenyl)furan-3-acetic acid, 2,5 - diphenylfuran-3-acetic acid, and 2,5 - di - (p-chlorophenyl)furan - 3 - acetic acid as shown in the following table which shows the percent inhibition of the rat paw oedema and dosage tested.

| Compound | Dose, mg./kg. | Percent inhibition |
| --- | --- | --- |
| 2,5-di-(p-methoxyphenyl)furan-3-acetic acid | 50 | 35 |
| 2,5-diphenylfuran-3-acetic acid | 20 | 40 |
| 2,5-di-(p-chlorophenyl)furan-3-acetic acid | 20 | 35 |

EXAMPLE 60

| | Mg. |
| --- | --- |
| 2,5-di-(p-fluorophenyl)furan-3-acetic acid | 125 |
| Lactose | 120 |
| Magnesium stearate | 5 |

Capsules of the above were made up by thoroughly mixing together batches of the above ingredients and filling hard gelatine capsules (250 mg.) with the mixture.

EXAMPLE 61

| | Mg. |
| --- | --- |
| 2,5-diphenyl-furan-3-acetic acid | 125 |
| Lactose | 100 |
| Avicel | 30 |
| Dried maize starch | 40 |
| Magnesium stearate | 5 |

Tablets of the above composition were made by milling the active ingredient to 40 mesh (British Standard), sieving through a 40 mesh (British Standard) sieve, mixing the milled material with the other components and compressing to form tablets.

EXAMPLE 62

2-(p-chlorophenyl)-5-phenylfuran-3-acetic acid (a) Sodium (2.3 g.) was added to a stirred solution of ethyl p-chlorobenzoylacetate (22.7 g.) in ether (300 ml.), in an atmosphere of nitrogen. After heating under reflux for 6 hours, the mixture was cooled and treated with phenacyl bromide (20.0 g.) followed by further heating under reflux for 1.5 hours. The mixture was again cooled and treated with water. Separating the organic layer, drying (MgSO₄) and evaporating gave 40.0 g. of ethyl 2 - (p-chlorobenzoyl) - 3 - benzoylpropionate as a red oil which slowly crystallised and had M.P. 61–62° C. after recrystallisation from ethanol.

(Found (percent): C, 66.3; H, 4.8. $C_{19}H_{17}ClO_4$ requires (percent): C, 66.1 H, 5.0)

(b) A mixture of the ester of part (a) and glacial acetic acid (40 ml.) containing concentrated sulphuric acid (2 drops) was heated under reflux for 1 hour and the excess of acetic acid evaporated under reduced pressure. The residue was treated with water to give an oil which was extracted into ether, dried and evaporated to give an oil which slowly crystallised. Recrystallisation from ethanol gave 2.0 g. of 2-(p-chlorophenyl)-3-ethoxycarbonyl-5-phenylfuran, M.P. 72–73° C.

(Found (percent): C, 70.15; H, 4.6. $C_{19}H_{15}ClO_3$ requires (percent): C, 69.8; H, 4.6.)

(c) The ethoxycarbonyl furan of part (b) (7.6 g.) in sodium dried ether (60 ml.) was added dropwise to a stirred suspension of lithium aluminium hydride (0.5 g.) in ether (60 ml.), at such a rate as to maintain steady reflux. After the addition was complete, the mixture was heated under reflux for 1 hour, cooled, and the complex decomposed by addition of methanol (2 ml.), then water (10 ml.) and finally 2 N hydrochloric acid. The ether layer was separated, washed with water, dried and evaporated to give 7.3 g. of the crude 2-(p-chlorophenyl)-3-hydroxymethyl - 5 - phenylfuran. Recrystallisation from ethanol gave 6.3 g. of the pure compound of M.P. 133–134° C.

(Found (percent): C, 71.5; H, 4.6. $C_{17}H_{13}ClO_2$ requires (percent): C, 71.7; H, 4.6.)

(d) A suspension of the hydroxymethyl compound of part (c) (6.5 g.) in dry methylene chloride (50 ml.) was treated with thionyl chloride (2.0 ml.). After 15 minutes at room temperature, the excess of solvent and thionyl chloride was evaporated and the residue recrystallised from ethanol to give 2.5 g. of 3-chloromethyl-2-(p-chlorophenyl)-5-phenylfuran of M.P. 94–95° C.

(Found (percent): C, 67.5; H, 4.0. $C_{17}H_{12}Cl_2O$ requires (percent): C, 67.35; H, 4.9.)

(e) A solution of the chloromethyl compound of part (d) (8.0 g.) and sodium cyanide (1.3 g.) in dimethylsulphoxide (30.0 ml.) was heated at 80° C. for 2 hours and then cooled and poured into water. The precipitated oil was extracted into ether, washed well with water, dried and evaporated to give a solid residue which after recrystallisation from ethanol gave 7.0 g. of 2-(p-chlorophenyl)-5-phenylfuran - 3 - acetonitrile of M.P. 117–118° C.

(Found (percent): C, 73.3; H, 4.15; N, 4.5.

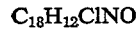

requires (percent): C, 73.6; H, 4.1; N, 4.8.)

(f) A mixture of the nitrile of part (c) (2.1 g.) and sodium hydroxide (2.2 g.) in ethanol (14 ml.) and water (16 ml.) was heated under reflux for 16 hours. The mixture was evaporated to dryness, the oily residue dissolved in water, washed with ether, and then acidified to pH 1. An ether extract of the acidified mixture was washed with water, dried and evaporated to give a solid residue, which after recrystallisation from benzene gave 1.4 g. of the title acid, M.P. 140–141° C.

(Found (percent): C, 68.9; H, 4.1. $C_{18}H_{13}ClO_3$ requires (percent): C, 69.1; H, 4.2.)

EXAMPLE 63

5-(p-chlorophenyl)-2-phenylfuran-3-acetic acid (a) The method of Example 62(a) using ethyl benzoylacetate and p-chlorophenacylbromide gives ethyl 3-(p-chlorobenzoyl)-2-benzoylpropionate, M.P. 90–91° C.

(Found (percent): C, 66.1; H, 4.9. $C_{19}H_{17}ClO_4$ requires (percent): C, 66.2; H, 5.0.)

(b) Refluxing a mixture of 2.0 g. of the ester of part (a) and glacial acetic acid (20 ml.) and concentrated sulphuric acid (2 drops) for 1 hour and working up as described in Example 23 gives 1.5 g. of 5-(p-chlorophenyl)-3-ethoxycarbonyl-2-phenyl-furan of M.P. 73–74° C. after recrystallising from ethanol.

(Found (percent): C, 69.9; H, 4.6. $C_{19}H_{15}ClO_3$ requires (percent): C, 69.8; H, 4.6.)

(c) A solution of the ester of part (b) (11.4 g.) in sodium dried ether (100 ml.) was added dropwise to a stirred suspension of lithium aluminium hydride (0.7 g.) in sodium dried ether (150 ml.) at such a rate as to keep the reaction gently refluxing. After addition, the reaction mixture was boiled under reflux for 1 hour, cooled and methanol (5 ml.), followed by water (20 ml.), followed by 2 N hydrochloric acid (40 ml.) were added to the mixture. The ethereal layer was separated, washed well with water, saturated sodium chloride, dried over $MgSO_4$ and evaporated to give 5-(p-chlorophenyl)-3-hydroxymethyl-2-phenylfuran, which was recrystallised from ethanol (9.8 g.), M.P. 119–120° C.

(Found (percent): C, 71.8; H, 4.6. $C_{17}H_{13}ClO_2$ requires (percent): C, 71.7; H, 4.6.)

(d) Thionylchloride (1.2 ml.) was added dropwise to a solution of 5-(p-chlorophenyl)-2-phenylfuran-3-methanol (4.27 g.) in dry methylene chloride at room temperature. The solution was left for 3 hours and then washed with water, saturated sodium chloride, dried ($MgSO_4$) and evaporated to give 3-chloromethyl-5-(p-chlorophenyl)-2-phenylfuran which was recrystallised from aqueous ethanol (1.85 g.), M.P. 99–100° C.

(e) 3 - chloromethyl-5-(p-chlorophenyl)-2-phenylfuran (0.5 g.) was dissolved in dry dimethylformamide (10 ml.) and warmed to 40° C. Sodium cyanide (0.09 g.) was added to the stirred solution which was kept at 40° C. for 2 hours and left for 17 hours at room temperature. The reaction mixture was then poured into excess water and the aqueous solution extracted with ether. The ethereal extract was washed with water, saturated sodium chloride solution, dried ($MgSO_4$) and evaporated to give 5-(p-chlorophenyl)-3-cyanomethyl-2-phenylfuran which was recrystallised from aqueous ethanol (0.12 g.), M.P. 89–90° C.

(f) 5-p-chlorophenyl-3-cyanomethyl-2-phenylfuran (4.0 g.) was dissolved in ethanol (28 ml.) and a solution of sodium hydroxide (4.2 g.) in water (12 ml.) added. The solution was boiled under reflux for 17 hours and evaporated and the crude product dissolved in water and washed with ether. The equeous solution was acidified and the oil extracted into fresh ether.

The ethereal solution was washed with water, saturated sodium chloride, dried ($MgSO_4$) and evaporated to give the title compound which was recrystallised from benzene (2.0 g.), M.P. 177–178° C.

(Found (percent): C, 69.3; H, 4.2. $C_{18}H_{13}ClO_3$ requires (percent): C, 69.1; H, 4.2.)

EXAMPLE 64

2,5-diphenylthiophene-3-acetic acid (a) A solution of diethyl α,β-dibenzoylethylmalonate (7.84 g.) and anhydrous stannic chloride (12.0 g.) in chloroform (500 ml.) is treated with dry hydrogen chloride for 1 minute and then hydrogen chloride and hydrogen sulphide are introduced simultaneously for 2 hours. After the mixture has stood for 16 hours at room temperature it is washed with water, sodium hydrogen carbonate solution, water and is then dried. Evaporating to dryness then gives 4.0 g. of diethyl 2,5-diphenylthiophene-3-malonate, M.P. 62–63° C. after recrystallisation from aqueous ethanol.

(Found (percent): C, 70.0; H, 5.6. $C_{23}H_{22}O_4S$ requires (percent): C, 70.0; H, 5.66.)

(b) Diethyl 2,5-diphenylthiophene-3-malonate (3.44 g.) was dissolved in ethanol (10 ml.) and 2 N sodium hydroxide solution (7.5 ml.) added. The solution was boiled under reflux for 2 hours and then evaporated. Water was added to the residue and the aqueous solution was washed with ether and then acidified with concentrated hydrochloric acid. The liberated oil was extracted into ether which was washed with water, saturated sodium chloride solution and dried over magnesium sulphate to give the crude di-acid (2.34 g.).

The crude di-acid (2.34 g.) was dissolved in dimethylformamide (10 ml.) and boiled under reflux for 1 hour and when cool the solution was poured into water. The crude acid was extracted into ether which was washed with water and then with 2 N sodium carbonate solution. The carbonate extract was aciidfied with concentrated hydrochloric acid to give a white solid which was recrystallised from benzene (1.22 g.), M.P. 155–156° C.

(Found (percent): C, 73.6; H, 4.8. $C_{18}H_{14}O_2S$ requires (percent): C, 73.4; H, 4.8.)

EXAMPLE 65

2,5-di-(p-fluorophenyl)furan-3-acetamide

The product of Example 9 (5.0 g.) in methylene chloride (50 ml.) containing dimethylformamide (1 drop) and thionyl chloride (1.3 g.) was heated under reflux for 2 hours. Evaporation to dryness under reduced pressure gave the acid chloride as residue which was re-dissolved in methylene chloride (20 ml.) and treated dropwise while stirring with an excess of 0.880 ammonia solution. The precipitated solid was filtered off, washed with water and recrystallised from 91% ethanol to give 3.0 g. (60%) of the title amide as off-white needles, M.P. 189–191° C.

(Found (percent): C, 69.1; H, 4.2; N, 4.6. $C_{18}H_{13}F_2NO_2$ requires (percent): C, 69.0; H, 4.2; N, 4.5.)

EXAMPLE 66

2,5-di-(p-bromophenyl)furan-3-acetic acid (a) A mixture of 163.0 g. of di-(p-bromophenacyl)dimethylammonium bromide [see Chem. Ber., 89, 822–836 (1956)], 2 N sodium hydroxide solution (300 ml.) and chloroform (300 ml.) was shaken for 2 hours. The chloroform layer was then separated, dried ($MgSO_4$) and evaporated and the residue then dissolved in ethanol, neutralised with 2 N hydrochloric acid and then filtered to give 106 g. of crude di-(p-bromobenzoyl)ethylene. Recrystallisation gave the pure product, M.P. 192.5° C.

(Found (percent): C, 48.45; H, 2.5. $C_{16}H_{10}Br_2O_2$ requires (percent): C, 48.8; H, 2.6.)

(b) A mixture of the ethylene of part (a) (65.0 g.), diethyl malonate (27.23 g.) and piperidine (6.0 ml.) in ethanol (300 ml.) was heated under reflux for 19 hours. The solvent was then evaporated under reduced pressure, the residual oil was dissolved in ether, washed with 2 N hydrochloric acid and water and evaporated to dryness. The residue was crystallised from iso-propyl ether to give 68.5 g. of diethyl 1,2-di(p-bromobenzoyl)ethymalonate, M.P. 113.5° C.

Found (percent): 50.0; H, 4.0. $C_{23}H_{22}Br_2O_6$ requires (percent): C, 49.8; H, 4.0.)

(c) A hot solution of the malonate of part (b) (68.0 g.) in ethanol (200 ml.) was treated with 2 N sodium hydroxide solution (250 ml.) and then refluxed for 2 hours. Most of the ethanol was evaporated and the resulting solution treated with water (300 ml.) and then washed with ether. The aqueous solution was acidified to pH 2 with 2 N hydrochloric acid and then extracted with ether. The ether extract was dried ($MgSO_4$), evaporated to dryness and the residue recrystallised from di-(iso-propyl)ether to give 36.0 g. of 1,2-di-(p-bromobenzoyl) ethymalonic acid.

(d) A solution of the malonic acid of part (c) (36.0 g.) in dimethylformamide was heated under reflux for 2 hours. The excess of dimethylformamide was then evaporated under reduced pressure to give 26.25 g. of 3,4-di-(p-bromobenzoyl)butyric acid after recrystallisation from di-(iso-propyl)ether.

(e) The butyric acid (9.3 g.) prepared in part (d) in glacial acetic acid (40 ml.) containing concentrated sulphuric acid (2.0 ml.) was heated under reflux for 1 hour. The solution on cooling gave 7.8 g. of the title acid, M.P. 167–168° C.

(Found (percent): C, 50.0; H, 2.8. $C_{18}H_{12}Br_2O_3$ requires (percent): C, 49.6; H, 2.8.)

EXAMPLE 67

α-(2,5-diphenylfur-3-yl)-α-methylacetic acid (a) To a solution of sodium (1.226 g.) in ethanol (50 ml.) was added diethyl methylmalonate (10.0 g.) in ethanol (20 ml.) and the resulting mixture heated under reflux for 0.25 hour. The mixture was then cooled to −10° C. and a cooled suspension of dibenzoylethylene (13.6 g.) in ethanol (100 ml.) was added and the mixture stirred for 16 hours. Most of the ethanol was evaporated and the residue poured into water, acidified with 2 N hydrochloric acid and then extracted with benzene (3× 500 ml.). The extracts were dried (MgSO$_4$) and evaporated to give 23.3 g. of diethyl-1-methylpropane-1,1-dicarboxylate which was used for the next stage without purification.

(b) The diester of part (a) (23.3 g.) in ethanol (50 ml.) was treated with 2 N sodium hydroxide solution (125 ml.) and the resulting mixture heated under reflux for 3 hours. Most of the ethanol was evaporated the residue treated with water (100 ml.), washed with ether (5× 250 ml.) and then acidified with concentrated hydrochloric acid. The acidified solution was extracted with ether, the extract dried (MgSO$_4$) and evaporated to dryness to give 17.35 g. of 2,3-dibenzoyl-1-methylpropane-1,1-dicarboxylic acid.

(c) A solution of the di-acid of part (b) (9.062 g.) in dimethylformamide (25 ml.) was heated under reflux for 2 hours and then evaporated under reduced pressure to give 7.5 g. of 3,4-dibenzoyl-2-methylbutyric acid.

(d) A mixture of the butyric acid of part (c) (2.753 g.), glacial acetic acid (30 ml.) and concentrated sulphuric acid (1 ml.) was heated under reflux for 1 hour. The cooled mixture was poured into water, the precipitated solid filtered off and dried at 60° C. to give 2.0 g. of the title acid, M.P. 177–179° C.

(Found (percent): C, 78.4; H, 5.5. $C_{19}H_{16}O_3$ requires (percent): C, 78.1; H, 5.5.)

EXAMPLE 68

Ethyl 2,5-di-(p-fluorophenyl)furan-3-yl-acetate

A solution of the furan-acetic acid of Example 23 (5.0 g.) in ethanol (100 ml.) containing concentrated sulphuric acid (0.5 ml.) was heated under reflux for 17 hours, the solvent then evaporated and the residue dissolved in ether. The ether solution was washed with 2 N sodium hydroxide solution and water, dried (MgSO$_4$), evaporated and the residue recrystallised from aqueous ethanol to give 4.39 g. of the title ester, M.P. 84–85° C.

(Found (percent): C, 70.45; H, 4.9. $C_{20}H_{16}F_2O_3$ requires (percent): C, 70.2; H, 4.7.)

EXAMPLE 69

α-[2,5-di-(p-fluorophenyl)fur-3-yl]-α-methylacetic acid (a) To a solution of sodium (3.45 g.) in dry methanol (150 ml.) was added diethyl methylmalonate (25.7 g.) in methanol (100 ml.) and the mixture then heated under reflux for 0.5 hour. The mixture was then cooled to −10° C. in an ice-salt bath and treated with a cooled suspension of di-(p-fluorobenzoyl)ethylene (35.3 g.) [prepared as in Example 18 (a)] in methanol (150 ml.). After stirring the mixture for 16 hours at room temperature, most of the methanol was evaporated, the residue poured into water and washed with ether to remove any unchanged ester. The aqueous solution was then acidified with 2 N hydrochloric acid, extracted with ether (2× 500 ml.), dried and evaporated to give 41.1 g. of crude diethyl 2,3-di-(p-fluorobenzoyl)-1-methylpropane-1,1-dicarboxylate which was used for the next stage without further purification.

(b) To a hot solution of the diester of part (a) (36.08 g.) in ethanol (120 ml.) was added 2 N sodium hydroxide solution (180 ml.) and the mixture refluxed for 3 hours. Most of the ethanol was then evaporated, water (150 ml.) added to the residue which was then washed with ether (5× 250 ml.). The aqueous solution was acidified with concentrated hydrochloric acid, extracted with ether, the extract dried (MgSO$_4$) and evaporated to give 26.9 g. of crude 2,3-di-(p-fluorobenzoyl)-1-methylpropane-1,1-dicarboxylic acid which was used for the next stage without further purification.

(c) A solution of the di-acid of part (b) (26.91 g.) in dimethylformamide was heated under reflux for 1 hour and the excess of dimethylformamide then evaporated in vacuo at 75° C. to give 19.3 g. of 3,4-di-(p-fluorobenzoyl)-2-methylbutyric acid.

(d) A mixture of the butyric acid derivative of part (c) (6.516 g.) and concentrated sulphuric acid (2.0 ml.) in glacial acetic acid (50 ml.) was heated under reflux for 1 hour. The resulting mixture was then cooled, poured into water and the precipitated solid filtered off, dried and recrystallised from a mixture of benzene and 40–60° C. petroleum ether to give 1.7 g. of the title acid, M.P. 150–152° C.

(Found (percent): C, 69.9; H, 4.35. $C_{19}H_{14}F_2O_3$ requires (percent): C, 69.5; H, 4.3.)

EXAMPLE 70

β-[2,5-di-(p-fluorophenyl)fur-3-yl]propionic acid (a) The ester of Example 68 (12.15 g.) in sodium dried ether (200 ml.) was added to a suspension of aluminium lithium hydride (1.01 g.) in sodium dried ether at such a rate as to maintain reflux. After the addition was complete, the mixture was heated under reflux for 1 hour and then allowed to cool. The complex was destroyed by addition of water (10 ml.) and 1 N hydrochloric acid (25 ml.). The ether layer was washed with water, 1 N hydrochloric acid, 1 N sodium hydroxide solution, water, then dried (MgSO$_4$) and evaporated to give an oil which was crystallised from 80–100° C. petroleum ether to give 10.5 g. of 2-[2,5-di-(p-fluorophenyl)fur-3-yl]ethanol, M.P. 86–89° C.

(Found (percent): C, 72.2; H, 5.0. $C_{16}H_{14}H_2O_2$ requires (percent): C, 72.0; H, 4.7.)

(b) A solution of the alcohol from part (a) (5.0 g.) was dissolved in a small quantity of dichloromethane, treated with pyridine (1.31 g.) cooled to 10° C., treated with thionyl chloride (2.18 g.) and then heated for 0.5 hour at 40° C. The cooled solution was then acidified, the precipitated solid dissolved in dichloromethane and washed with dilute hydrochloric acid, sodium hydrogen carbonate solution, water and dried (MgSO$_4$). Evaporation to dryness gave an oily residue which slowly crystallised and was then recrystallised from aqueous ethanol to give 3.5 g. of 2-[2,5-di-(p-fluorophenyl)fur-3-yl]ethyl chloride.

(c) A solution of the above chloroethyl compound (3.31 g.) and sodium cyanide (0.56 g.) in dimethylsulphoxide (50 ml.) was stirred at 40° C. for 2 hours and then at room temperature for 90 hours. The mixture was then poured into water (200 ml.), extracted with ether, the ether extract washed with water, dried (MgSO$_4$) and evaporated. The solid residue was recrystallised from a mixture of benzene and 40–60° C. petroleum ether to give 1.86 g. of 3 - [2,5 - di-(p-fluorophenyl)fur-3-yl]propionitrile.

(Found (percent): C, 73.6; H, 4.2; N, 4.4. $C_{19}H_{13}F_2NO$ requires (percent): C, 73.9; H, 4.2; N, 4.5.)

(d) A mixture of the above nitrile (10.86 g.) and sodium hydroxide (10.85 g.) in water (60 ml.) and ethanol (140 ml.) was heated under reflux for 3 hours. The solution was evaporated, the residue suspended in water, acidified and the solid filtered off and dried. Recrystallisation from aqueous ethanol gave 8.52 g. of the title acid, M.P. 116–117° C.

(Found (percent): C, 69.1; H, 4.4. $C_{19}H_{14}F_2O_3$ requires (percent): C, 69.5; H, 4.3.)

EXAMPLE 71

Dimethylaminoethyl 2,5-di-(p-fluorophenyl)fur-3-ylacetate (a) The acid of Example 23 (5.0 g.) in dichloromethane (65 ml.) containing dimethylformamide (1 drop) was treated with thionyl chloride (1.9 ml.) and then heated under reflux for 1 hour. Evaporation of the excess of solvent and thionyl chloride gave 5.2 g. of the chloride of the starting acid which was used for the next stage without purification.

(b) To a solution of the above acid chloride (5.2 g.) in dichloromethane was added dimethylaminoethanol (3.28 g.) and the mixture heated under reflux for 0.5 hour. The solution was evaporated to dryness, the residue treated with a saturated aqueous sodium hydrogen carbonate solution and extracted into ether. The ether extract was washed with water, dried (MgSO$_4$) and evaporated to dryness. A dry ethanol solution of the residue was treated with ethanolic hydrogen chloride to give 4.93 g. of the hydrochloride of the title compound, M.P. 147° C.

Found (percent): C, 62.6; H, 5.5; N, 3.5.

$$C_{22}H_{21}F_2NO_3 \cdot HCl$$

requires (percent): C, 62.6; H, 5.3; N, 3.5.)

What is claimed is:

1. A compound having the formula:

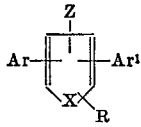

in which Ar and Ar$^1$ are each radicals of the group consisting of phenyl, halophenyl, lower-alkylphenyl, lower-alkoxyphenyl, nitrophenyl, aminophenyl, diloweralkylaminophenyl, trifluoromethylphenyl, 1- and 2- naphthyl, 2- and 3- furyl, 2- and 3- thienyl and 2-, 3- and 4- pyridyl; R is a member of the group consisting of radicals having the formula

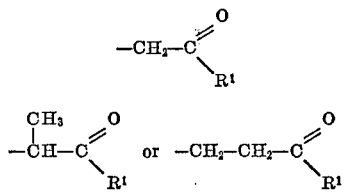

in which R$^1$ is a member of the group consisting of —OH, —NH$_2$, NHOH and lower alkoxy; Z is selected from the group consisting of hydrogen and loweralkyl; and X is a member of the group consisting of oxygen and sulphur.

2. A compound having the formula:

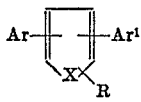

in which Ar and Ar$^1$ are each radicals of the group consisting of phenyl, halophenyl, loweralkylphenyl, loweralkoxyphenyl and trifluoromethylphenyl; R is a member of the group consisting of radicals having the formula —CH$_2$—CO$_2$H and —CH$_2$—CH$_2$—CO$_2$H and their lower alkyl esters; and X is a member of the group consisting of oxygen and sulphur.

3. A compound according to claim 2 which is 2,5-diphenylfuran-3-acetic acid.

4. A compound according to claim 2 which is 2,5-di-(p-chlorophenyl)furan-3-acetic acid.

5. A compound according to claim 2 which is 2,5-di-(p-fluorophenyl)furan-3-acetic acid.

6. A compound according to claim 2 which is 2,5-di-(p-methoxyphenyl)furan-3-acetic acid.

7. A compound according to claim 2 which is 2,5-di-(p-methylphenyl)furan-3-acetic acid.

8. A compound according to claim 2 which is 2,5-di-(p-bromophenyl)furan-3-acetic acid.

9. A compound according to claim 2 which is 2-(p-chlorophenyl)-5-phenylfuran-3-acetic acid.

10. A compound according to claim 2 which is 5-(p-chlorophenyl)-2-phenylfuran-3-acetic acid.

11. A compound according to claim 2 which is ethyl 2,5-di(p-fluorophenyl)-furan-3-acetate.

12. A compound according to claim 2 which is β-[2,5-di(p-fluorophenyl)-fur-3-yl]propionic acid.

13. A compound according to claim 2 which is 2,5-diphenylthiophene-3-acetic acid.

14. A compound according to claim 1 which is α-[2,5-diphenyl-fur-3-yl]-α-methylacetic acid.

15. A compound according to claim 1 which is α-[2,5-diphenyl-fur-3-yl]-α-methylacetic acid.

15. A compound according to claim 1 which is α-[2,5-di-(p-fluorophenyl)-fur-3-yl]-α-methylacetic acid.

16. A compound according to claim 1 which is 2,5-di-(p-fluorophenyl)-furan-3-acetamide.

References Cited

UNITED STATES PATENTS 3,644,399  2/1972  Brown et al. _____ 260—326.3

HENRY R. JILES, Primary Examiner

C. M. S. JAISLE, Assistant Examiner

U.S. Cl. X.R.

260—294.8 D, 295 R, 295 AM, 347.3, 347.4